(12) United States Patent
Hsieh et al.

(10) Patent No.: US 8,556,559 B2
(45) Date of Patent: Oct. 15, 2013

(54) CONNECTION ASSEMBLY

(75) Inventors: Jui-Kun Hsieh, Tu-Cheng (TW); Ho-Cheng Yang, Tu-Cheng (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 304 days.

(21) Appl. No.: 13/107,954

(22) Filed: May 15, 2011

(65) Prior Publication Data
US 2012/0251263 A1 Oct. 4, 2012

(30) Foreign Application Priority Data

Mar. 31, 2011 (TW) .............................. 10011454 A

(51) Int. Cl.
*F16B 39/28* (2006.01)
(52) U.S. Cl.
USPC .......................................... 411/140; 411/133
(58) Field of Classification Search
USPC .......... 411/140, 383, 395, 411, 424, 71, 80.6, 411/132, 133, 173, 381, 382
See application file for complete search history.

(56) References Cited

U.S. PATENT DOCUMENTS

| | | | | |
|---|---|---|---|---|
| 3,461,769 A * | 8/1969 | Brosseit | ........................ | 411/385 |
| 4,108,407 A * | 8/1978 | Cable et al. | ................... | 248/656 |
| 4,601,625 A * | 7/1986 | Ernst et al. | ................. | 411/387.4 |
| 4,655,656 A * | 4/1987 | Jonsson | ........................ | 411/337 |
| 4,711,232 A * | 12/1987 | Fischer et al. | ................... | 606/67 |
| 4,906,036 A * | 3/1990 | James | ........................... | 292/202 |
| 5,333,976 A * | 8/1994 | Dobbrunz | ..................... | 411/263 |
| 6,116,942 A * | 9/2000 | Chen et al. | .................... | 439/362 |

* cited by examiner

*Primary Examiner* — Roberta Delisle
(74) *Attorney, Agent, or Firm* — Altis & Wispro Law Group, Inc.

(57) ABSTRACT

A connection assembly for connecting a first member to a second member includes a first threaded member extending through the first member and engages with a first engagement hole of the second member, and a second threaded member extending through extending through the first threaded member and engages with a second engagement hole of the second member communicating with the first engagement hole.

6 Claims, 3 Drawing Sheets

CONNECTION ASSEMBLY

BACKGROUND

1. Technical Field

The present disclosure relates to a connection assembly to connect two members together.

2. Description of Related Art

Screws are widely used for connecting members. However, when the members connected with screws are operated or transported, the screws tend to loosen from vibration.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The present disclosure, including the accompanying drawings, is illustrated by way of examples and not by way of limitation. It should be noted that references to "an" or "one" embodiment in this disclosure are not necessarily to the same embodiment, and such references mean at least one.

Figure 1:
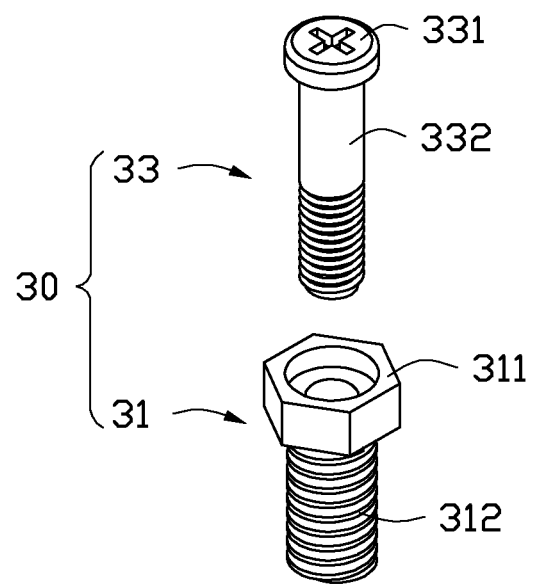
FIG. 1 is an exploded, isometric view of an embodiment of a connection assembly, together with two members to be connected.
Figure 1:
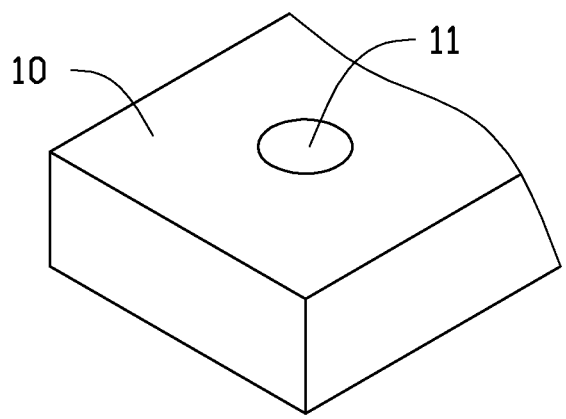
Figure 1:
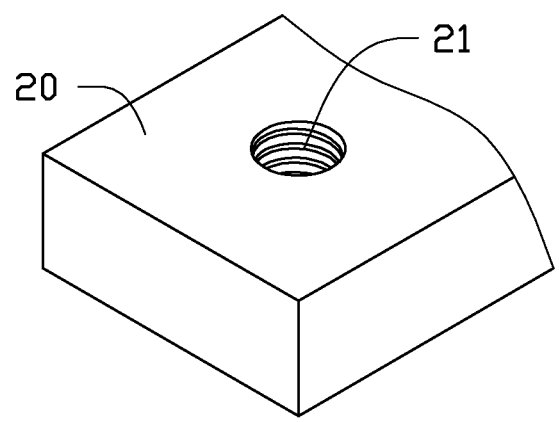

Referring to FIG. 1, an exemplary embodiment of a connection assembly 30 is provided for connecting a first member 10 to a second member 20.

Figure 2:
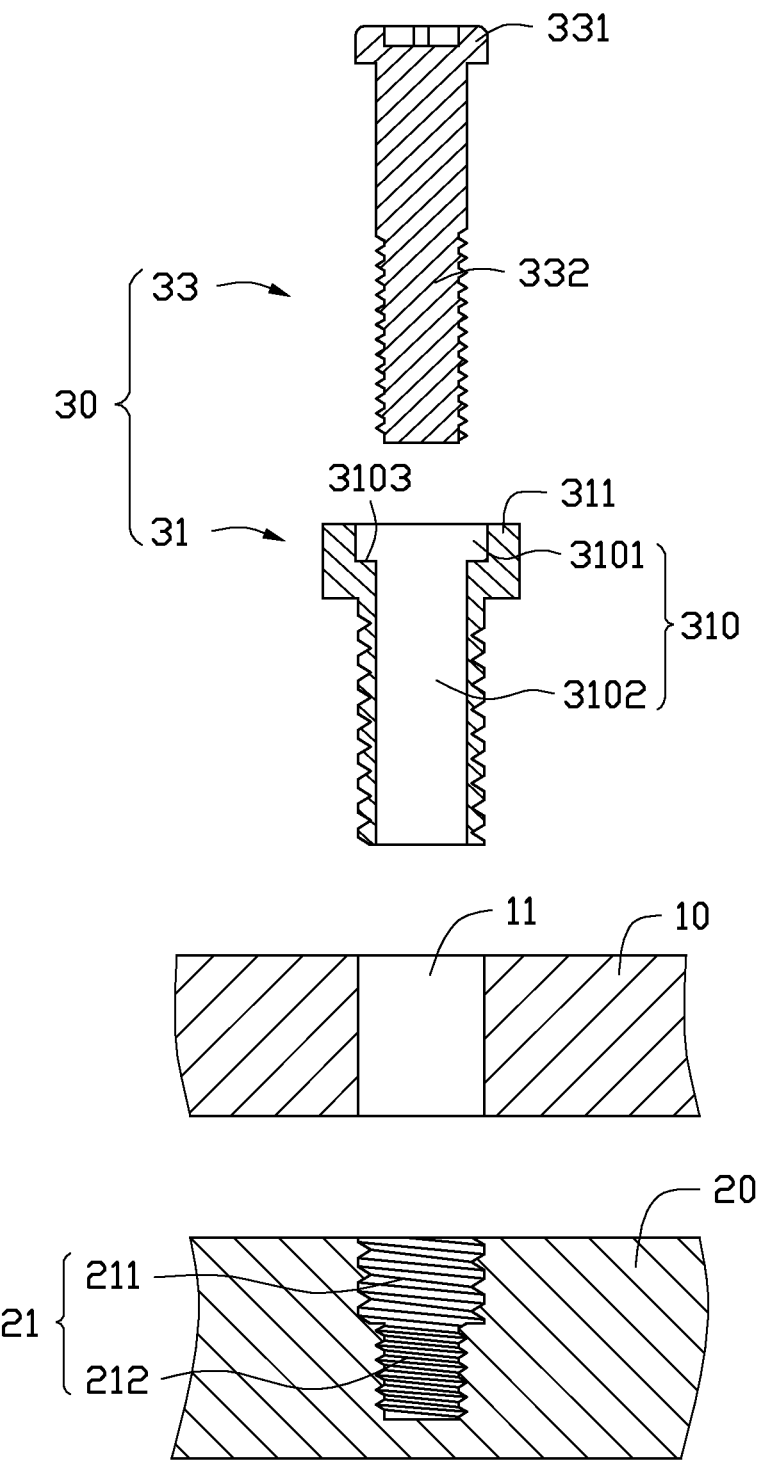
FIG. 2 is a cross sectional view of FIG. 1

Referring to FIG. 2, a mounting hole 11 is defined extending through top and bottom of the first member 10.

The second member 20 defines a threaded hole 21. The threaded hole 21 has a substantially T-shaped cross section, and includes a threaded first engagement hole 211 extending through a top of the second member 20, and a threaded second engagement hole 212 communicating with a lower end of the first engagement hole 211. A diameter of the second engagement hole 212 is less than a diameter of the first engagement hole 211.

The connection assembly 30 includes a first threaded member 31 and a second threaded member 33.

The first threaded member 31 includes a hexagonal head portion 311, and a threaded shank 312 extending from a bottom of the head portion 311. A through hole 310 is defined along an axis of the first threaded member 31, extending through the head portion 311 and the threaded shank 312. The through hole 310 includes a first accommodating hole 3101 defined in a top of the head portion 311, and a second accommodating hole 3102 defined in the threaded shank 312 and communicating with the first accommodating hole 3101. A diameter of the second accommodating hole 3102 is less than a diameter of the first accommodating hole 3101. A blocking portion 3103 is formed in the through hole 310 of the first threaded member 31, and arranged at a joint of the first and the second accommodating holes 3101 and 3102.

The second threaded member 33 includes a substantially coin-shaped head portion 331 and a threaded shank 332 extending from a bottom of the head portion 331. A diameter of the head portion 331 of the second threaded member 33 is less than the diameter of the first accommodating hole 3101, but greater than the diameter of the second accommodating hole of the through hole 310 of the first threaded member 31. A diameter of the threaded shank 332 of the second threaded member 33 is less than the diameter of the second accommodating hole 3102 of the through hole 310 of the first threaded member 31.

Figure 3:
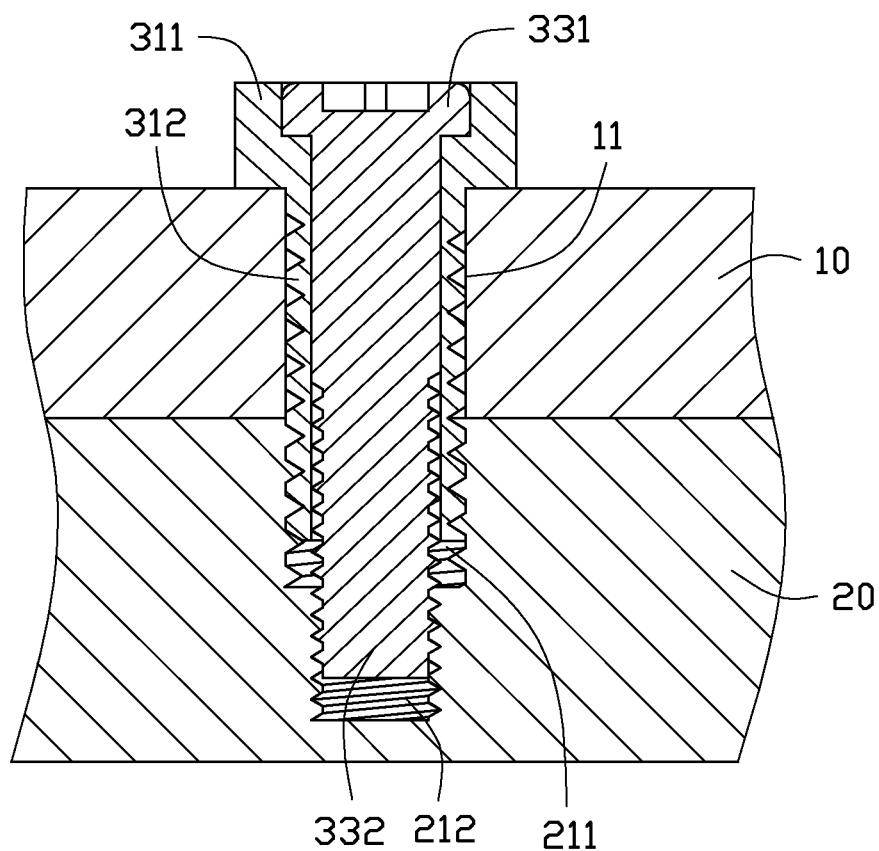
FIG. 3 is an assembled view of FIG. 2.

Referring to FIG. 3, in use, the first member 10 is stacked on the second member 20, with the mounting hole 11 of the first member 10 aligned with the threaded hole 21 of the second member 20. The threaded shank 312 of the first threaded member 31 extends through the mounting hole 11 of the first member 10 and engages in the first engagement hole 211 of the threaded hole 21 of the second member 20. The threaded shank 332 of the second threaded member 33 extends through the through hole 310 of the first threaded member 31 from the head portion 311. The threaded shank 332 of the second threaded member 33 extends out of through hole 310 of the first threaded member 31 to engage in the second engagement hole 212 of the threaded hole 21 of the second member 20. The first and the second threaded members 21 and 31 are tightened by a wrench and a screw driver, respectively. The head portion 331 of the second threaded member 33 abuts against the blocking portion 3103 of the first threaded member 31. The first member 10 and the second member 20 are connected with two engagements, one engagement is between the first threaded member 31 and threaded hole 21 of the second member 21, and the other engagement is between the second threaded member 33 and threaded hole 21 of the second member 21. At the same time, the second threaded member 33 abuts against the first threaded member 31, thereby avoiding loosening of the first threaded member 31 from the second member 20. Therefore, it is easy to understand that the present embodiment of the connection assembly 30 described above make the connection between the first member and the second member more reliable.

It is to be understood, however, that even though numerous characteristics and advantages of the embodiments have been set forth in the foregoing description, together with details of the structure and function of the embodiments, the present disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A connection assembly to connect a first member to a second member, the connection assembly comprising:

a first threaded member to extend through the first member, and engage in a first engagement hole of the second member to connect the first and second members together, the first threaded member axially defining a through hole therein; wherein the first threaded member comprises a head portion to resist against the first member; and a second threaded member to extend through the through hole of the first threaded member, and engage in a second engagement hole of the second member communicating with the first engagement hole.

2. The connection assembly of claim 1, wherein the through hole of the first threaded member comprises a first accommodating hole and a second accommodating hole, a diameter of the first accommodating hole is greater than a diameter of the second accommodating hole; a blocking portion is formed in the through hole of the first threaded member, arranged at a joint of the first and the second accommodating holes; the second threaded member comprises a head portion and a threaded shank extending from a bottom of the head portion; the head portion of the second threaded member is received in the first accommodating hole of the through hole of the first threaded member, and abuts against the blocking portion of the first threaded member; the threaded shank of the second threaded member extends through the second accommodating hole of the through hole of the first threaded member and engages in the second engagement hole of the second member.

3. The connection assembly of claim 2, wherein the first threaded member further comprises a threaded shank extending from a bottom of the corresponding head portion to extend through the first member and engage in the first engagement hole of the second member, and the first accommodating hole of the through hole of the first threaded member is defined in the head portion of the first threaded member.

4. The connection assembly of claim 3, wherein the head portion of the first threaded member is hexagonal.

5. An assembly, comprising:
a first member defining a mounting hole extending through top and bottom of the first member;
a second member defining a first engagement hole extending through a top of the second member, and a second engagement hole below and communicating with the first engagement hole; and
a connection assembly comprising:
a first threaded member comprising a head portion and a threaded shank extending from the head portion, the first threaded member defining a through hole through the head portion and the threaded shank, wherein the head portion of the first threaded member resists against the top of the first member; and
a second threaded member comprising a threaded shank;
wherein the threaded shank of the first threaded member extends through the mounting hole of the first member and engages in the first engagement hole of the second member; and
wherein the threaded shank of the second threaded member extends through the through hole of the first threaded member and engages in the second engagement hole of the second member.

6. The assembly of claim 5, wherein the through hole of the first threaded member comprises a first accommodating hole extending through a top of the head portion, and a second accommodating hole extending through the corresponding threaded shank and communicating with the first accommodating hole, a diameter of the second accommodating hole is less than a diameter of the first accommodating hole; wherein the second threaded member further comprises a head portion extending from a top of the corresponding threaded shank; wherein the head portion of the second threaded member is received in the first accommodating hole, and the threaded shank of the second threaded member extends through the second accommodating hole to engage with the second engagement hole of the second member.

* * * * *